US009672858B2

(12) United States Patent
Watanabe et al.

(10) Patent No.: US 9,672,858 B2
(45) Date of Patent: Jun. 6, 2017

(54) MAGNETIC RECORDING MEDIUM MANUFACTURING METHOD

(71) Applicant: KABUSHIKI KAISHA TOSHIBA, Minato-ku (JP)

(72) Inventors: Akira Watanabe, Kawasaki (JP); Kaori Kimura, Yokohama (JP); Takeshi Iwasaki, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 286 days.

(21) Appl. No.: 14/517,030

(22) Filed: Oct. 17, 2014

(65) Prior Publication Data
US 2016/0027462 A1   Jan. 28, 2016

(30) Foreign Application Priority Data

Jul. 24, 2014   (JP) ................. 2014-150663

(51) Int. Cl.
G11B 5/84       (2006.01)
G11B 5/73       (2006.01)
G11B 5/733      (2006.01)
G11B 5/855      (2006.01)

(52) U.S. Cl.
CPC ............... *G11B 5/84* (2013.01); *G11B 5/733* (2013.01); *G11B 5/7305* (2013.01); *G11B 5/855* (2013.01)

(58) Field of Classification Search
None
See application file for complete search history.

(56) References Cited

U.S. PATENT DOCUMENTS 2,367,286 A * 1/1945 Keeleric .............. B24D 18/00
                                                164/112
5,492,769 A * 2/1996 Pryor .................. B05D 5/02
                                                428/552
5,629,092 A   5/1997 Gay et al.
6,162,532 A  12/2000 Black et al.
(Continued)

FOREIGN PATENT DOCUMENTS

JP   7-326727   12/1995
JP   8-236329    9/1996
(Continued)

OTHER PUBLICATIONS

Chartier et al. "metal-assisted chemical etching of silicon in HF-H2O2" Electrochimica Acta 53 (2008) 5509-5516.*

Primary Examiner — Mandy Louie
(74) Attorney, Agent, or Firm — Oblon, McClelland, Maier & Neustadt, L.L.P.

(57) ABSTRACT

According to one embodiment, there is provided a magnetic recording medium manufacturing method including forming a bonding layer on a substrate, forming a holding layer containing silicon on the bonding layer, forming a single-particle layer on the holding layer using particles containing metal fusible on the bonding layer, etching $SiO_2$ in the holding layer using an etching solution containing HF and $H_2O_2$, filling the holding layer with the particles until the particles are brought into contact with the bonding layer, bonding the particles and the bonding layer together by heating, and forming a magnetic recording layer on the single-particle layer.

10 Claims, 2 Drawing Sheets

(56) References Cited

U.S. PATENT DOCUMENTS

| | | | |
|---|---|---|---|
| 6,451,387 B1* | 9/2002 | Wadman | B32B 37/04 |
| | | | 427/554 |
| 7,718,254 B2 | 5/2010 | Matsumura et al. | |
| 2008/0210087 A1* | 9/2008 | Ku | B01D 53/228 |
| | | | 95/51 |
| 2010/0248449 A1* | 9/2010 | Hildreth | B81C 1/00071 |
| | | | 438/460 |
| 2011/0140367 A1* | 6/2011 | Shi | C23C 14/025 |
| | | | 277/442 |
| 2014/0231383 A1* | 8/2014 | Gurney | G11B 5/855 |
| | | | 216/22 |

FOREIGN PATENT DOCUMENTS

| | | |
|---|---|---|
| JP | 9-36437 | 2/1997 |
| JP | 11-210741 | 8/1999 |
| JP | 2000-48340 | 2/2000 |
| JP | 2002-170227 | 6/2002 |
| JP | 2010-172886 | 8/2010 |

\* cited by examiner

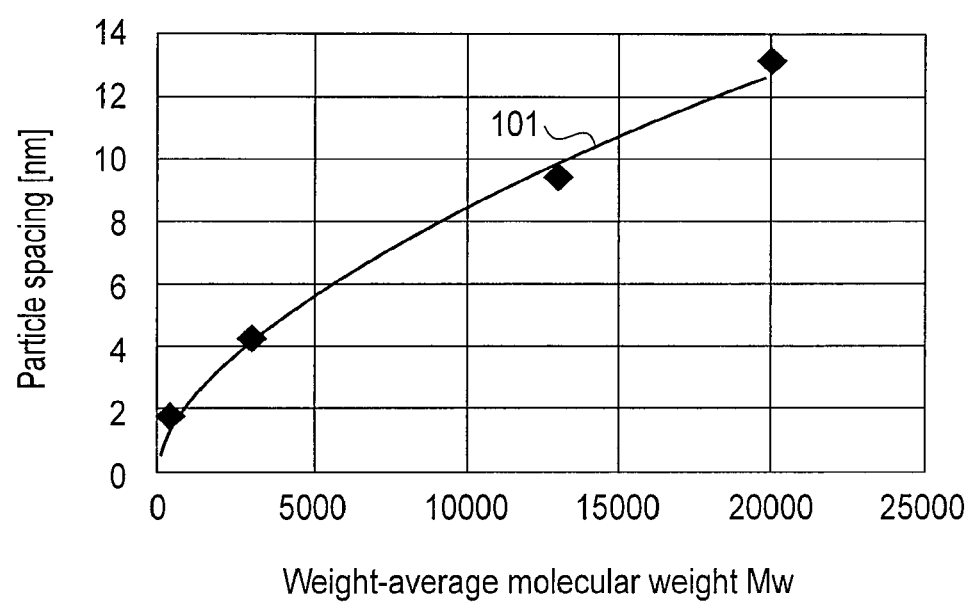
F I G. 1

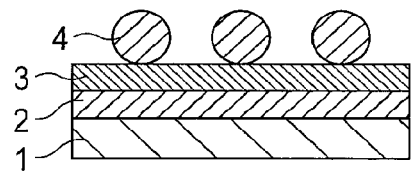
F I G. 2A
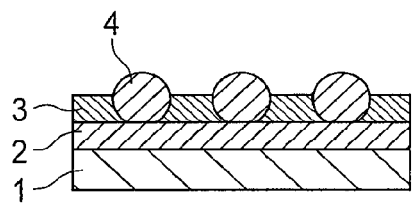
F I G. 2B
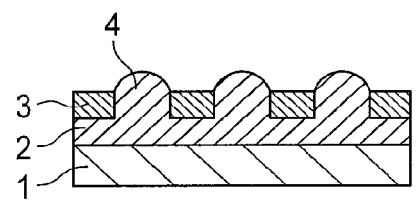
F I G. 2C
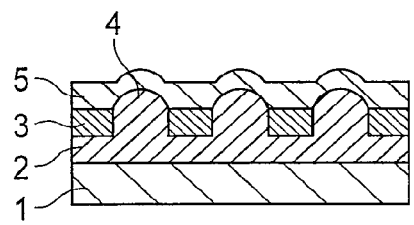
F I G. 2D
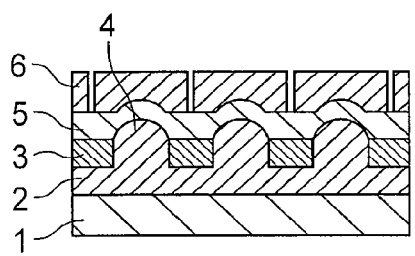
F I G. 2E
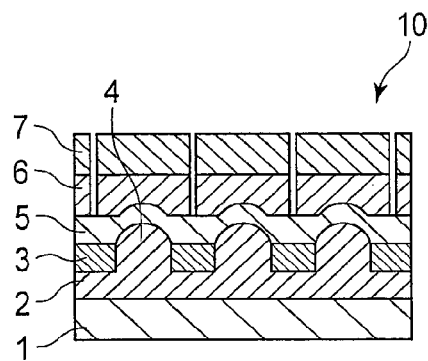
F I G. 2F

MAGNETIC RECORDING MEDIUM MANUFACTURING METHOD

CROSS-REFERENCE TO RELATED APPLICATIONS

This application is based upon and claims the benefit of priority from Japanese Patent Application No. 2014-150663, filed Jul. 24, 2014, the entire contents of which are incorporated herein by reference.

FIELD

Embodiments described herein relate generally to a magnetic recording medium manufacturing method.

BACKGROUND

Microstructures regularly arranged at a period of a few nm to a few hundred nm can be applied to a technique such as a magnetic recording medium, a semiconductor device, photonic crystal, an antireflection film and an adsorption substrate. These structures can be formed by, e.g., a method of writing patterns on a resist using an electron beam lithography apparatus, an ultraviolet lithography apparatus or the like, or a method using a self-organization phenomenon of a diblock copolymer or particles. Particularly, in pattern forming methods using particles, a projections pattern can be formed using particles easily by etching a protective group. In the projections pattern formed by particles by etching, however, the particles are not bonded to the substrate, with the result that the adhesion of the particles to the substrate is bad and the particles may be removed from the substrate in the subsequent step.

To prevent the above-described problem, there is a prior art method of fixing particles onto a substrate (electrode) using a thermoplastic resin. However, this method causes a problem in which the substrate and the particles are not chemically bonded to each other, but the particles are easily removed from the substrate by heating them after the fixation. To resolve the problem, there is a method of removing an organic constituent and then coating the particles with inorganic materials to suppress movement of the particles. However, this method causes a problem in which a projections pattern formed by the particles is planarized by a coating layer provided on the particles.

BRIEF DESCRIPTION OF THE DRAWINGS

FIG. 1 is a graph showing a relationship between weight-average molecular weight of a protective group and particle spacing; and FIGS. 2A, 2B, 2C, 2D, 2E and 2F are views showing an example of a magnetic recording medium manufacturing method according to an embodiment.

DETAILED DESCRIPTION

In general, according to one embodiment, a magnetic recording medium manufacturing method includes:
forming a bonding layer containing first metal on a substrate;
forming a holding layer containing silicon on the bonding layer;
forming a single-particle layer on the holding layer using particles containing second metal bondable in a solid state on the bonding layer;
etching silicon oxide in the holding layer using an etching solution containing hydrofluoric acid and hydrogen peroxide and filling the holding layer with the particles until the particles are brought into contact with the bonding layer; and
forming a magnetic recording layer on the single-particle layer.

The method further includes bonding the particles and the bonding layer together by heating at least one of before and after forming the magnetic recording layer.

The silicon oxide is formed by oxidation reaction of the holding layer in a region that contacts the particles under catalysis of the second metal.

The single-particle layer can be used as a seed layer having a projections pattern. The projections pattern can be transferred to the magnetic recording layer by forming the magnetic recording layer on the single-particle layer. However, the particles are simply deposited on the substrate and thus easily removed therefrom by external force such as friction. According to the embodiment, therefore, the removal of particles due to external force such as friction can be prevented by solid state bonding to chemically bond the bonding layer to the particles. The solid state bonding can improve crystalline orientation dispersion in the particles under the influence of crystalline orientation of the bonding layer. Accordingly, a magnetic recording medium having a high SNR can be manufactured.

Forming a single-particle layer in the method can include:
dispersing the particles in a solvent to prepare a particle coating solution using the particles containing the second metal fusible on the bonding layer and having a first coating layer formed on a surface thereof using a first high-polymer material; and
coating a substrate having a second coating layer with the particle coating solution to form a single-particle layer, the second coating layer being formed using a second high-polymer material having a skeleton that is equal to that of the first high-polymer material.

The solvent can have a chain structure.

The first high-polymer material can be polystyrene having number average molecular weight ranging from 1000 to 50000.

The second high-polymer material can be polystyrene having number average molecular weight ranging from 1000 to 50000.

The solvent can be one of methyl ethyl ketone and methyl propyl ketone.

The particle coating solution can be coated by a dip coating method.

Particles

The particles to be used are particles having a particle size of 1 nm to 1 μm. The shape of the particles is often a sphere, but it is possible to use particles the shape of which is a tetrahedron, rectangular parallelepiped, octahedron, triangular prism, hexagonal prism, cylinder or the like. When the particles are arranged closest to one another or when the holding layer is filled with the particles by wet etching, the symmetry of the shape can be increased and, for example, the particles can be formed as a sphere. To improve the arrangement properties during coating, the particle size dispersion can be decreased. There is a proportional relationship between the particle size dispersion and the orientation dispersion (pitch dispersion). For example, when the particle size dispersion is about 10%, the pitch dispersion of particles of a single-particle layer in which the particles are arranged and formed, is about 7%. When the particle size dispersion is about 15%, the pitch dispersion is 10%. When the particle size dispersion is about 30%, the pitch dispersion is 17%. Thus, the particle size dispersion can be set at 15% or less, and can also be set at 10% or less.

As the material of the particles, second metal selected from Pd, Ag, Pt and Au can be used. For example, when a work function is 5 eV or more, Pd, Pt and Au which are noble metals can be used.

Since the particles are arranged in a solution system, they are used as being stably dispersed in a solution while a protective group (coating layer), which will be described below, is attached to them.

Protective Group (First High-Polymer Material)

As the protective group, organic material containing a reactive functional group such as a carboxy group and a thiol group at a terminal, can be used. In general, the thiol group reacts with particles such as Au, Ag, Pd and Pt.

The reactive functional group of the protective group can be bonded to fine particles and the main chain of the protective group can be used for particle spacing adjustment or polarity adjustment for an array. Generally, the polarity can be well explained using a solubility parameter (SP value). The SP value is large for a material having a large polarity such as water, and small for a material having a small polarity. On the surface of carbon (C) or silicon (Si), the SP value can be set at 25 $MPa^{1/2}$ or less. As the main chain of the organic material, it is possible to use a material containing one or more general hydrocarbons ($C_nH_{2n+1}$), double bonds, or triple bonds, an aromatic hydrocarbon such as polystyrene, polyester, polyether or the like. Examples of materials having carboxy groups are capric acid, lauric acid, palmitic acid and stearic acid as saturated hydrocarbons, and palmitoleic acid, oleic acid, linoleic acid and linolenic acid as unsaturated hydrocarbons. Similarly, examples of thiol groups are $C_nH_{2n+1}$-thiol, $C_nH_{2n}$-thiol and the like. As the main chain, it is also possible to use a polymer such as polyester, polyethylene, epoxy, polyurethane, polystyrene and polypropylene. Since the process causes the protective group to react later, a protective group having a straight-chain structure having few branches can be used. Especially when polystyrenes are used, its SP value is close to that of a coating solvent, so the solubility and coating properties are good. The protective group has the advantage of not only increasing particle spacing but also improving a particle array. Physical space in which particles can freely move when a solvent is dried, is necessary for the particle array. When particle spacing is narrow, the influence of Van der Waals forces among particles is so great as to prevent the particles from moving. In particular, when there is no protective group but the surfaces of the particles are exposed, the particles aggregate and cannot move. If a protective group is modified on the surfaces of the particles and the spacing between the particles is increased, the influence of Van der Waals forces among the particles is suppressed, and the array can be improved without preventing the particles from moving.

FIG. 1 is a graph showing a relationship between weight-average molecular weight of a protective group and particle spacing when polystyrenes is used as the protective group.

In FIG. 1, the particle spacing becomes large when the molecular weight of the protective group is increased, as indicated by reference numeral 101.

If the particles are used as a recording pattern such as a memory and a storage, the particle spacing increases and thus the pattern density decreases. The particle spacing can be set to 10% to 200% of the diameter of each of the particles. Polystyrenes having number average molecular weight ranging from 1000 to 50000 can also be used as the first high-polymer material.

Substrate Treatment Material (Second High-Polymer Material)

The material that is usable as a substrate treatment material can be the same as that of a protective group with which the surfaces of the particles are covered. More specifically, as the main chain of organic material used in the substrate treatment material, it is possible to use a material containing one or more general hydrocarbons ($C_nH_{2n+1}$), double bonds or triple bonds, an aromatic hydrocarbon such as polystyrene, polyester, polyether or the like. The main chain may also be a high polymer such as polyester, polyethylene, epoxy, polyurethane, polystyrene and polypropylene. The reaction of the substrate to the substrate treatment material may include hydrolysis reaction using a hydroxyl group, silane coupling reaction and so on.

Unlike the protective group, the molecular weight is free from restraint; however, when there are few reaction groups on the substrate surface, it is likely that the coverage factor of the substrate surface will deteriorate if the molecular weight is less than 300 and the particle array will worsen. Accordingly, the molecular weight can be set to 3000 or more.

Since the substrate treatment material is the same as the material of the protective group, the interaction between the particles and the substrate can be strengthen and a crack can be prevented from appearing when a solvent is dried.

Solvent

As the solvent for dispersing the particles, a solvent having a high affinity for the above-described particle protective groups can be used. When the substrate is coated with particles by the spin coating method, a solvent whose boiling point is about 150° C. can be used. When the substrate is coated with particles by the dip coating method, it is desirable to use a solvent whose boiling point is about 80° C.

If the spin coating method is employed, for example, xylene, cyclohexane, propyleneglycol monomethylether, butyl acetate, PGMEA and diethyleneglycol dimethyl ether are used. If the dip coating method is employed, for example, hexane, MEK, ethyl acetate, ethyleneglycol dimethyl ether, THF, cyclohexane and dichloroethane are used. As the solvent used in the dip coating method in particular, it is desirable to use a solvent having a chain structure, such as MEK, ethyl acetate and ethyleneglycol dimethyl ether, especially MEK having a high dielectric constant. Water having a high dielectric constant can be used as a solvent and, in this case, it is necessary to select a protective group that is dissolved into the water.

Coating Method

The substrate is coated with the particles using, e.g., a spin coating method, a dip coating method and an L (Langmuir) method.

In the spin coating method, the fine particle dispersion having an adjusted concentration is dropped on the substrate, and the solvent is dried by rotating the substrate. The film thickness can be controlled by the rotational speed.

In the dip coating method, the substrate is dipped in the dispersion, and the fine particles are adhered to the substrate by the viscous force and intermolecular force when the substrate is pulled up. The film thickness can be controlled by the pulling rate. In the spin coating method, an excess particle coating solution is discarded when the film thickness is controlled by the rotational speed, whereas in the dip coating method, the amount of particle coating solution to be discarded is small because an excess particle coating solution is returned to a container when the film thickness is controlled by pulling up the substrate.

In the L method, the polarity of the particle protective group and that of the solvent are dissociated from each other to make a state in which a monolayer of the particles floats on the surface. After that, the fine particles can be arranged on the substrate by pulling up the dipped substrate.

Type of Holding Layer

As the holding layer, a Si layer can be used. SI in the Si layer can be replaced with amorphous or crystalline material.

Thickness of Holding Layer

It is favorable that the thickness of the holding layer be one-third or more and two-thirds or less the particle size. If the particle size is 12 nm, it is favorable that the thickness of the holding layer be 4 nm or more and 8 nm or less. The thickness of the holding layer corresponds to the height of a projections structure that supports the particles. If the thickness of the holding layer is less than 4 nm, the projections structure is low and bonding is caused by heating; thus, the particles are likely to go out of recesses of the projections structure. If the thickness is more than 8 nm, the projections structure is also low, with the result that after a magnetic recording layer is formed, magnetic particles are bonded strongly together and an SNR is likely to decrease.

Solid State Bonding Method

The particles and the substrate can be bonded together in a solid state by heating. If fine particles are bonded in a vacuum, the solid state bonding can be performed at a temperature that is lower than the melting point of bulk metal. If the fine particles are Au, they can be bonded in a solid state by heating at about 200° C. If the fine particles are Pt, they can be bonded in a solid state by heating at about 400° C. When the bonding is performed by heating, the crystal orientation of particles is influenced by that of a base, and the crystal orientation can be improved by recrystallization.

Bonding Layer

As the bonding layer, material which is complete-solid-soluble in elements that constitute the particles can be selected. From the viewpoint of crystal orientation, it is favorable that the material of the bonding layer be material having the same crystal structure as that of the particles. The following Table 1 shows the characteristics of materials usable for the particles and the bonding layer. With respect to the lattice spacing, when the crystal structure is fcc, the values of a-axis are shown and when it is hcp, the values of c-axis are shown.

TABLE 1

| Material | Work Function | Crystal Structure | Lattice Spacing |
|---|---|---|---|
| Pd | 5.12 | fcc | 3.89 |
| Ag | 4.26 | fcc | 4.09 |
| Pt | 5.65 | fcc | 3.92 |
| Au | 5.10 | fcc | 4.08 |

As is apparent from the above table, it is favorable that the particles and the bonding layer be selected from the group of Pd, Ag, Pt and Au.

Of the group, Au is excellent as the particles and the bonding layer because its bonding temperature is low.

Filling into Holding Layer

The particles can be filled into a holding layer by wet etching using HF and $H_2O_2$. When the work function of metal to be used is greater than that of silicon that is a holding layer, the particles serve as a catalyst to oxidize the surface of the silicon which is in contact with the particles. Since the oxidized silicon is soluble in HF, only the portion of the silicon, which is in contact with the particles, is progressing with etching to allow the particles to be filled into the holding layer. The ratio between HF and $H_2O_2$ is adjusted appropriately by the density of a silicon layer on which the holding layer is formed, the size of the particles and the like. More specifically, the ratio of $H_2O_2$ can be increased when etching for filling does not progress and the amount of $H_2O_2$ can be reduced when the dispersion of an etching pattern increases.

Roughness Inhibition Layer

A roughness inhibition layer can be formed between a bonding layer and the above holding layer.

As the roughness inhibition layer, it is favorable to use material that does not react to the bonding layer or the holding layer at the time of heating. The bonding layer needs to be formed to such a thickness that it is not completely coated. It is thus favorable that the roughness inhibition layer has a plurality of openings. It is also favorable that the layer thickness be 1 nm or less. Furthermore, it is favorable to use material whose layer grows rather than material which is easy to grow in a striped fashion. As examples of the material, there are metal, carbon, silicon, germanium and the like. The roughness inhibition layer serves not only to suppress roughness at the time of heating but also as a stopper for etching to fill the particles into the holding layer and, from the viewpoint of this, too, it is favorable that the material be carbon.

A base layer can arbitrarily be provided between the substrate and the bonding layer.

As material for the base layer, for example, Ni, Pd, Pt, Ta or an alloy of these materials can be used. The base layer can improve the crystal orientation of the bonding layer and the particles at the time of bonding The embodiment will be described below with reference to the accompanying drawings.

EXAMPLE 1

An example of the magnetic recording medium manufacturing method according to the embodiment will be described with reference to FIGS. 2A to 2F.

As a substrate 1, for example, a glass substrate, an Al-based alloy substrate, ceramics, carbon and a Si monocrystalline substrate having an oxide surface can be used.

Example 1 will be described taking a glass substrate (amorphous substrate MEL6 manufactured by KONICA MINOLTA, diameter=2.5 inches) as an example. As a deposition apparatus used in the Example, a DC magnetron sputtering apparatus (C-3010 manufactured by CANON ANELVA) can be used.

As shown in FIG. 2A, a 40-nm thick soft magnetic layer (CoZrNb) (not shown) was deposited on the glass substrate 1 and then a 10-nm Au layer was deposited as a bonding layer 2 and a 5-nm Si layer was deposited as a holding layer 3. After that, the surface of the substrate 1 was rendered hydrophilic by UV light and the substrate 1 was dipped for 10 seconds into a PGMEA solution in which 5000-molecular weight polystyrene (PS) having a hydroxyl group was dissolved at a concentration of 1.0 wt %. Then, the substrate 1 was pulled up at a rate of 1 mm/second, and the substrate 1 on the surface of which a PS film (not shown) was formed by the dip coating method was heated at 170° C. for 20 hours, thereby chemically adsorbing PS to the surface of the substrate 1 on which the bonding layer 2 and the holding layer 3 were formed. After that, the substrate was dipped into the PGMEA solution, and surplus PS that did not react to the substrate was washed and rinsed.

A particle layer 4 of a monolayer was formed on the holding layer 3 of the resultant substrate 1 by the spin coating method.

The solution used in spin coating was prepared by the following method. As the particles, Au particles having an average particle diameter of 10 nm were used. The Au particles were coated with PS having an average molecular weight of 5000. The Au particles and PS were chemically bonded together by means of a thiol group. After that, the Au particles coated with PS were dispersed in propyleneglycol 1-methylether acetate (PGMEA) to prepare a 3 wt % concentration particle solution. After the particle layer 4 was formed on the holding layer 3, a PS coating layer (not shown) was removed from the formed particle layer 4. Dry etching was used to remove the PS coating layer. Oxygen was used as etchant. The coating layer can be removed not only by the dry etching but also by ultraviolet lithography or the like.

The particles of the particle layer 4 from which the coating layer was removed, tend to aggregate easily by external action, such as heating and friction and disturb their array. Accordingly, the holding layer 3 formed by Si was filled with the particles so as not to disturb the array of the particles.

The substrate 1 with the particle layer 4 from which the coating layer was removed, was dipped for about 60 seconds into a mixed solution including HF and $H_2O_2$ mixed at a volume ratio of 1:3 and then cleaned by pure water. On the holding layer 3 in a region that contacts the particles of the particle layer 4, a silicon dioxide was formed by oxidation reaction under catalysis of the second metal. Thus, the silicon dioxide can be etched by the dipping and the particles can be filled into the holding layer as shown in FIG. 2B. The etching of the Si holding layer 3 was stopped using the Au bonding layer 2, which was formed on the base of the Si holding layer 3, as a stopper.

Subsequently, the substrate 1 was heated at 200° C. for 20 seconds. In this step, as shown in FIG. 2C, solid state bonding was occurred between the Au particles and the Au bonding layer 2 exposed to the lower part of the holding layer 3, and the particle layer 4 and the substrate 1 were chemically bonded to each other. It was confirmed that the particles bonded to the substrate 1 were not separated by friction or the like.

After that, a magnetic recording layer was formed on the resultant substrate.

First, as shown in FIG. 2D, a NiTa layer of 5 nm was deposited as a crystal orientation control layer 5 and then a Pd layer of 3 nm (not shown) was formed.

Furthermore, as shown in FIG. 2E, a Ru layer of 10 nm is deposited as an intermediate layer 6 on the crystal orientation control layer 5.

After that, as shown in FIG. 2F, $Co_{80}Pt_{20}$ of 15 nm was deposited as the intermediate layer 6 on the crystal orientation control layer 5. Finally, a protective film (not shown) was formed by chemical vapor deposition (CVD) and coated with a lubricant, thereby obtaining a patterned medium 10 according to the embodiment.

When the planar structure of the patterned medium manufactured by the method as described above was observed with an SEM, the dispersion of the CoPt particle sizes was 8.0%. This result shows that a magnetic recording medium in which the size distribution is low can be obtained from the micropattern of the particle layer according to the embodiment.

Head floating characteristics of the obtained patterned medium were evaluated. When an amount of head floating was adjusted to 3 nm, good head floating characteristics were obtained without errors.

After that, recording/reproduction characteristics of the manufactured perpendicular magnetic recording medium were evaluated using Read/Write Analyzer 1632 and Spin Stand S1701MP manufactured by GUZIK in U.S. As a recording/reproduction head, a single-pole head having a saturation magnetic flux density of about 2 T was used as a recording section and a head employing a Giant Magneto Resistive effect was used as a reproduction element. In evaluating a reproduction signal output/medium noise ratio (S/Nm), an amplitude at a track recording density of about 50 kFCl was used as reproduction signal output S and a mean-square value at a track recording density of about 400 kFCl was used as Nm.

As a result, no spike noise was observed on the entire surface of a disk, but a good value of 18.8 dB was obtained as S/Nm. Furthermore, a signal whose track recording density is about 100 kFCl was recorded on the recording medium, and a power decline due to a thermal decay was evaluated. The reproduction power was periodically measured for 100,000 seconds after the completion of a recording scan, and a reproduction power decline fell within a range of measurement error and a signal decay rate was about −0 dB/decade.

In this time, a patterned medium can be also manufactured in the same manner as in the medium except that the substrate 1 is heated for solid state bonding between the Au particles and the Au bonding layer 2 after forming the recording layer instead of before forming the recording layer.

EXAMPLE 2

A magnetic recording medium was manufactured in the same manner as in Example 1, except that the heating temperature for bonding between the Au particles and the Au bonding layer was varied as follows.

The heating temperature was varied to 50° C., 100° C., 200° C., 300° C. and 400° C. using a substrate manufactured according to Example 1. The heating time was 20 seconds. Film adhesion of a manufactured sample was evaluated using Nanoindenter (manufactured by HYSITRON, TI 950 TrivoIndenter) and surface flatness thereof was evaluated using an atomic force microscope. As the Nanoindenter, an indenter having a tip diameter of 1 μm was used. Moreover, head floating characteristics of the manufactured medium were evaluated by a glide tester. The floating characteristics exhibit a minimum amount of floating by which the head can float without errors. The results of these evaluations are shown in Table 2 below.

TABLE 2

| Heating Temperature | Weighted Value at which Particles are Removed | Surface Ra | Floating Characteristics |
| --- | --- | --- | --- |
| Not Heated | 100 μN | 0.3 nm | 3 nm |
| 50° C. | 100 μN | 0.3 nm | 3 nm |
| 100° C. | 200 μN | 0.4 nm | 3 nm |
| 200° C. | 1000 μN | 0.5 nm | 3 nm |
| 300° C. | 3000 μN | 1.5 nm | 8 nm |
| 400° C. | 3000 μN | 1.8 nm | 10 nm |

The following can be seen from Table 2. The film adhesion is improved by increasing the heating temperature. In terms of the weighted value at which the particles are removed, the substrate and the particles are bonded together at 200° C. or higher. The film surface roughness deteriorates as the heating temperature increases. In accordance with the film surface roughness, the head floating characteristics vary and deteriorate at a heating temperature of 300° C. or higher. In terms of the floating characteristics, the heating temperature can be set at 200° C. or lower.

EXAMPLE 3

In order to suppress surface roughness caused at the time of bonding, a roughness inhibition layer can be formed between a bonding layer 2 and a holding layer 3 further. In Example 2, a patterned medium was formed in the same manner as in Example 1, except that a roughness inhibition layer was interposed between the bonding layer 2 and the holding layer 3 as described below.

Like in Example 1, a glass substrate (amorphous substrate MEL6 manufactured by KONICA MINOLTA, diameter=2.5 inches) was used as a substrate. For deposition, a DC magnetron sputtering apparatus (C-3010 manufactured by CANON ANELVA) was used. After a 40-nm thick soft magnetic layer (CoZrNb) was deposited on the glass substrate, a 10-nm thick Au layer was deposited as a bonding layer, a 1-nm thick C layer was deposited thereon as a roughness inhibition layer, and a 5-nm thick Si layer was deposited thereon as a holding layer. After that, the same process as that of Example 1 was performed to form an Au particle layer on the substrate. A PS coating layer was removed by etching and then a holding layer formed by Si was filled with particles using HF and $H_2O_2$. With this filling, only the Si that contacts the particles was removed by etching, with the result that the particles could be filled into the Si holding layer as illustrated in FIG. 2B. The etching of the Si holding layer was stopped using a C roughness inhibition layer, which was formed on the base of the Si holding layer, as a stopper. Since the C layer was used as a stopper layer, a termination of the etching could be detected more stably than when the Au layer was used as a stopper layer.

Subsequently, the substrate was heated at 200° C. for 20 seconds. In this step, solid state bonding was occurred between the Au particles and the Au bonding layer exposed to the lower part of the particles, and the particles and the substrate 1 were chemically bonded to each other. It was confirmed that the particles bonded to the substrate were not separated by friction or the like.

After that, a magnetic recording layer was formed on the resultant substrate. First, a NiTa layer of 5 nm was deposited for crystal orientation control and then a Pd layer of 3 nm (not shown) and an intermediate Ru layer of 10 nm were deposited one on another in sequence. After that, $Co_{80}Pt_{20}$ of 15 nm was deposited as a magnetic recording layer.

Finally, a protective film (not shown) was formed by chemical vapor deposition (CVD) and coated with a lubricant, thereby obtaining a patterned medium according to the embodiment.

When the planar structure of the patterned medium manufactured by the method as described above was observed with an SEM, the dispersion of the CoPt particle sizes was 6.0%. This result shows that a magnetic recording medium in which the size distribution is low can be obtained from the micropattern of the particle layer according to the embodiment.

Head floating characteristics of the obtained medium were evaluated. When an amount of head floating was adjusted to 5 nm, good head floating characteristics were obtained without errors. As compared with Example 1, the surface roughness was reduced by inserting the roughness inhibition layer, with the result that the head could be floated at lower rotational speed and more satisfactory results could be obtained from touchdown measurement at the time of glide avalanche measurement.

After that, recording/reproduction characteristics of the manufactured perpendicular magnetic recording medium were evaluated using Read/Write Analyzer 1632 and Spin Stand S1701MP manufactured by GUZIK in U.S. As a recording/reproduction head, a single-pole head having a saturation magnetic flux density of about 2 T was used as a recording section and a head employing a Giant Magneto Resistive effect was used as a reproduction element. In evaluating a reproduction signal output/medium noise ratio (S/Nm), an amplitude at a track recording density of about 50 kFCI was used as reproduction signal output S and a mean-square value at a track recording density of about 400 kFCI was used as Nm. As a result, no spike noise was observed on the entire surface of a disk, but a good value of 19.8 dB was obtained as S/Nm. Furthermore, a signal whose track recording density is about 100 kFCI was recorded on the recording medium, and a power decline due to a thermal decay was evaluated. The reproduction power was periodically measured for 100,000 seconds after the completion of a recording scan, and a reproduction power decline fell within a range of measurement error and a signal decay rate was about −0 dB/decade.

EXAMPLE 4

In Example 4, heating temperature dependence of a sample in which a roughness inhibition layer is inserted was checked. In Example 4, a patterned medium was manufactured in the same manner as in Example 3, except that the heating temperature was varied as follows.

The heating temperature was varied to 50° C., 100° C., 200° C., 300° C. and 400° C. using a substrate manufactured according to Example 3. The heating time was 20 seconds. The manufactured sample was measured in the same manner as in Example 2. In comparison with the sample, a sample that was not heated was prepared to make measurements in the same manner as in Example 2. The results of these measurements are shown in Table 3 below.

TABLE 3

| Heating Temperature | Weighted Value at which Particles are Removed | Surface Ra | Floating Characteristics |
|---|---|---|---|
| Not Heated | 100 μN | 0.3 nm | 3 nm |
| 50° C. | 100 μN | 0.3 nm | 3 nm |
| 100° C. | 200 μN | 0.4 nm | 3 nm |
| 200° C. | 1000 μN | 0.3 nm | 3 nm |
| 300° C. | 3000 μN | 0.6 nm | 3 nm |
| 400° C. | 3000 μN | 1.0 nm | 8 nm |

The film adhesion is improved by increasing the heating temperature. In terms of the film adhesion, the heating temperature can be set at 200° C. or higher. Though the film surface roughness deteriorates when the heating temperature is 400° C., the floating characteristics do not deteriorate when the heating temperature is not higher than 300° C. Since the roughness inhibition layer is inserted, an advantage of suppressing surface roughness due to an increase in heating temperature can be confirmed. However, when the heating temperature is 400° C., the surface roughness deteriorates and so do the floating characteristics. It is considered that the deterioration was caused by the fact that the C layer was used as the roughness inhibition layer and changed in quality due to heating at 400° C. In terms of the floating characteristics, the sample in which the roughness inhibition layer is inserted can be heated at 300° C. or lower.

EXAMPLE 5

In Example 5, the particles and the bonding layer differ in materials from each other.

In Example 5, a magnetic recording medium was manufactured in the same manner as in Example 1, except that the medium contains Au materials and its bonding layer contains the materials shown in Table 4 below.

Adhesion and surface roughness of the magnetic recording medium were evaluated. Crystal orientation of Au was also evaluated using an X-ray diffraction (XRD) apparatus. As conditions for improving the adhesion, the heating temperature was set at 400° C. and the heating time was set at 20 seconds. In comparison with the sample, a sample that was not heated was prepared to make the same evaluations.

The results of these evaluations are shown in Table 4 below.

TABLE 4

| Bonding layer | Weighted Value at which Particles are Removed | Surface Ra | Au Crystal Orientation (X-ray Intensity) |
|---|---|---|---|
| Au | 1000 µN | 0.3 nm | 280000 |
| Cu | 500 µN | 0.3 nm | 4000 |
| Ag | 500 µN | 0.4 nm | 6000 |
| Pt | 100 µN | 0.3 nm | 6000 |
| Ru | 100 µN | 0.3 nm | 5000 |
| Pd | 100 µN | 0.3 nm | 10000 |

The adhesion of Cu and Ag which are complete-solid-soluble in Au particles, or the weighted values at which Cu and Ag are removed are larger than those of the other materials. However, it was found that the adhesion was the highest when Au, which was the same material as the particles, was used as a bonding layer, whereas the surface roughness did not vary from bonding layer material to bonding layer material. With respect to the crystal orientation of Au, Pd whose lattice spacing is close to that of Au has a large value. The crystal orientation of Au is large because the intensity of Au as not only particles but also a bonding layer, is measured.

The adhesion can be improved by increasing the heating temperature. The results obtained by heating at 400° C. for 20 seconds are shown in Table 5 below.

TABLE 5

| Bonding layer | Weighted Value at which Particles are Removed | Surface Ra | Au Crystal Orientation (X-ray Intensity) |
|---|---|---|---|
| Au | 3000 µN | 1.8 nm | 320000 |
| Cu | 1000 µN | 0.6 nm | 8000 |
| Ag | 1000 µN | 0.7 nm | 12000 |
| Pt | 500 µN | 0.6 nm | 12000 |
| Ru | 500 µN | 0.7 nm | 10000 |
| Pd | 500 µN | 0.8 nm | 20000 |

The adhesion can be improved by increasing the heating temperature, as can be the crystal orientation of Au. The adhesion can be set at 500 µN or higher and further set at 1000 µN. The crystal orientation can be set at 10000 or higher and further set at 20000 or higher.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium manufacturing method comprising:
    forming a bonding layer containing first metal on a substrate;
    forming a holding layer containing silicon on the bonding layer;
    forming a roughness inhibition layer between the bonding layer and the holding layer, which is made of carbon, and which includes a plurality of openings;
    forming a single-particle layer on the holding layer using particles containing second metal bondable in a solid state on the bonding layer;
    etching silicon dioxide with an etching solution containing hydrofluoric acid and hydrogen peroxide solution and embedding the holding layer with the particles until the particles are brought into contact with the bonding layer, the silicon dioxide being formed by oxidation reaction of the holding layer under catalysis of the second metal in a region that contacts the particles;
    bonding the particles and the bonding layer together by heating; and
    forming a magnetic recording layer on the single-particle layer.

2. The method according to claim 1, wherein the first metal is selected from the group consisting of gold, silver, platinum and palladium.

3. The method according to claim 1, wherein the second metal is selected from the group consisting of gold, silver, platinum and palladium.

4. The method according to claim 1, wherein the first metal and the second metal are same metal.

5. The method according to claim 4, wherein the first metal and the second metal are gold.

6. A magnetic recording medium manufacturing method comprising:
    forming a bonding layer containing first metal on a substrate;
    forming a holding layer containing silicon on the bonding layer;
    forming a roughness inhibition layer between the bonding layer and the holding layer, which is made of carbon, and which includes a plurality of openings;
    forming a single-particle layer on the holding layer using particles containing second metal bondable in a solid state on the bonding layer;
    etching silicon dioxide with an etching solution containing hydrofluoric acid and hydrogen peroxide solution and embedding the holding layer with the particles until the particles are brought into contact with the bonding layer, the silicon dioxide being formed by oxidation reaction of the holding layer under catalysis of the second metal in a region that contacts the particles;

forming a magnetic recording layer on the single-particle layer; and heating the substrate on which the magnetic recording layer is formed, to bond the particles and the bonding layer together.

7. The method according to claim 6, wherein the first metal is selected from the group consisting of gold, silver, platinum and palladium.

8. The method according to claim 6, wherein the second metal is selected from the group consisting of gold, silver, platinum and palladium.

9. The method according to claim 6, wherein the first metal and the second metal are same metal.

10. The method according to claim 9, wherein the first metal and the second metal are gold.

* * * * *